United States Patent [19]

Legille

[11] 4,110,617

[45] Aug. 29, 1978

[54] INFRA-RED PROFILOMETER

[75] Inventor: Edouard Legille, 165, rte de Treves, Luxembourg, Luxembourg

[73] Assignee: S.A. des Anciens Establissements Paul Wurth, Luxembourg

[21] Appl. No.: 777,443

[22] Filed: Mar. 14, 1977

[30] Foreign Application Priority Data

Mar. 17, 1976 [LU] Luxembourg .......................... 74579

[51] Int. Cl.² .......................... G01J 1/00; G01F 23/00
[52] U.S. Cl. ..................................... 250/342; 250/357
[58] Field of Search .............. 250/340, 342, 349, 357; 266/80, 87, 92; 73/355 R

[56] References Cited

U.S. PATENT DOCUMENTS 3,588,067  6/1971  Shimotsuma et al. ................. 266/80

Primary Examiner—Alfred E. Smith
Assistant Examiner—Janice A. Howell
Attorney, Agent, or Firm—Leydig, Voit, Osann, Mayer & Holt, Ltd.

[57] ABSTRACT

An apparatus and method for determining the three-dimensional surface profile of the charge or burden in a furnace. A pair of infra-red radiation measuring instruments receives infra-red rays from temperature-characterized points on the surface and generates temperature-position signals for the points. Signals generated by a first instrument are paired with the signals generated by the second instrument that correspond to identical temperature-characterized points. The position in space of each temperature-characterized point is determined from the known relative positions of the instruments and the two position components of the paired signals.

25 Claims, 5 Drawing Figures

INFRA-RED PROFILOMETER

BACKGROUND OF THE INVENTION

The present invention relates to a process and an apparatus for determining, without contact, a three-dimensional surface profile of the interior of a furnace, particularly of the surface of the charge in a shaft furnace or of the burden in a blast furnace.

With the recent development of the bell-less charging apparatus, as disclosed for instance in the U.S. Pat. No. 3,693,812 to R. Mahr et al., it has become possible to introduce a charge into a furnace and distribute it in any desired manner therein. This apparatus also makes it possible to compensate for local subsidence of the charge or burden by replenishing the charging material at points where this has occurred, thus restoring the desired surface configuration of the charge or burden. Therefore, charging apparatus is available to restore the surface of the burden to an optimum configuration throughout the entire furnace if the surface profile can be accurately determined. Thus, it is extremely desirable to be able to determine the exact and complete surface profile of the charge or burden, either continuously, or at least at regular intervals.

Mechanical profilometers are a known means for determining surface profiles, but the operation of these devices requires that a probe be introduced either vertically or horizontally into the furnace, and then into direct contact with the surface of the burden. An example of such a profilometer is disclosed in U.S. Pat. No. 3,816,932. Such mechanical profile probes suffer a serious drawback in that the primary measuring elements are exposed to rigorous conditions, as regards temperature, dust, and corrosion, caused by the blast furnace top gas. Thus, they undergo rapid wear and require expensive regular maintenance. A second serious drawback of the mechanical probes is that during the lengthy period in which the measuring elements are in the furnace the charging process must be delayed.

Attempts have also been made to determine the surface profile of the furnace charge by punctiform (point-by-point) scanning with electro-magnetic, ultrasonic and radio-active rays. By comparison with the mechanical devices, these profilometers offer the advantage that they operate by a contactless system, i.e. without any mechanical contact with the surface to be measured. However, the known radiation profilometers operate with a focused beam, and only one point at a time can be measured on the surface of the charge. Thus, with these devices the surface must be scanned point by point, in which process the radiation profilometer must perform a mechanical movement in separate steps. Such methods usually enable the profile to be determined in only one plane of intersection with the surface of the charge; a profile picture extending over a number of such planes would necessitate a corresponding number of different radiation profilometers of the same type, positioned at different points in the head of the blast furnace.

SUMMARY OF THE INVENTION

The present invention utilizes the fact that, according to Wien's Law, every heated body emits radiation, of which the wave length depends on the temperature of said body. The invention also utilizes the fact that infra-red rays are able to penetrate a dusty or foggy atmosphere without undergoing any appreciable absorption.

The use of an infra-red television camera for monitoring temperature conditions is known. Significantly, infra-red radiation measuring instruments are now known which are capable of determining the individual temperatures of points on the surface of a furnace charge or burden. The temperature-position signals generated by these infra-red measuring instruments can be connected, via an electronic image-forming system, with an image screen on which the temperature distribution appears in the form of differently colored areas. The two-dimensional image that the instruments generate are thereby reproduced as analogous colored temperature pictures in which each color corresponds to a certain temperature.

It is also known, from the sphere of photogrammetry, that a stereoscopic image pair of a given surface can be evaluated to provide a topographical map of the surface. Such works as *Theory of Spectrophotogrammetry* by Sanjib K. Ghosh (1972), and the works listed in the bibliography thereof, set forth the necessary equations for performing such analyses.

The present invention is based on the realization that the exactly defined temperature which characterizes each point on the heated surface of a charge or burden in a furnace can be used for the purpose of determining the relative position of the points in space. In accordance with the present invention, a plurality of infra-red measuring instruments located in known positions and in known orientations relative to one another are utilized to fix the angular position of temperature-characterized points on the surface from two geometrically different positions. As it is possible to determine the relative position in space of a temperature-characterized point for which angular directions have been fixed from different known positions, a plurality of infra-red measuring instruments which perform this function can, in accordance with the present invention, be utilized to determine substantially complete three-dimensional surface profiles.

It is a primary object of the present invention to provide a method and an apparatus for determining the surface profile of the charge or burden in a furnace without physically contacting the charge or burden or interrupting charging of the furnace.

A further object of the invention is to provide a method and apparatus for determining the surface profile which does not necessitate exposure of the primary measuring elements to the rigourous conditions within furnaces.

Another primary object of the invention is to provide a method and apparatus whereby substantially complete surface profiles may be determined.

These and other objects and advantages of the present invention will become apparent from the following detailed description of the invention taken in conjunction with the accompanying drawings in which.

While the invention will be described in connection with certain preferred embodiments, it is to be understood that the invention is not intended to be limited to the disclosed embodiments but, on the contrary, it is intended to cover the various alternatives, modifications and equivalent arrangements included within the spirit and scope of the appended claims.

Figure 1:
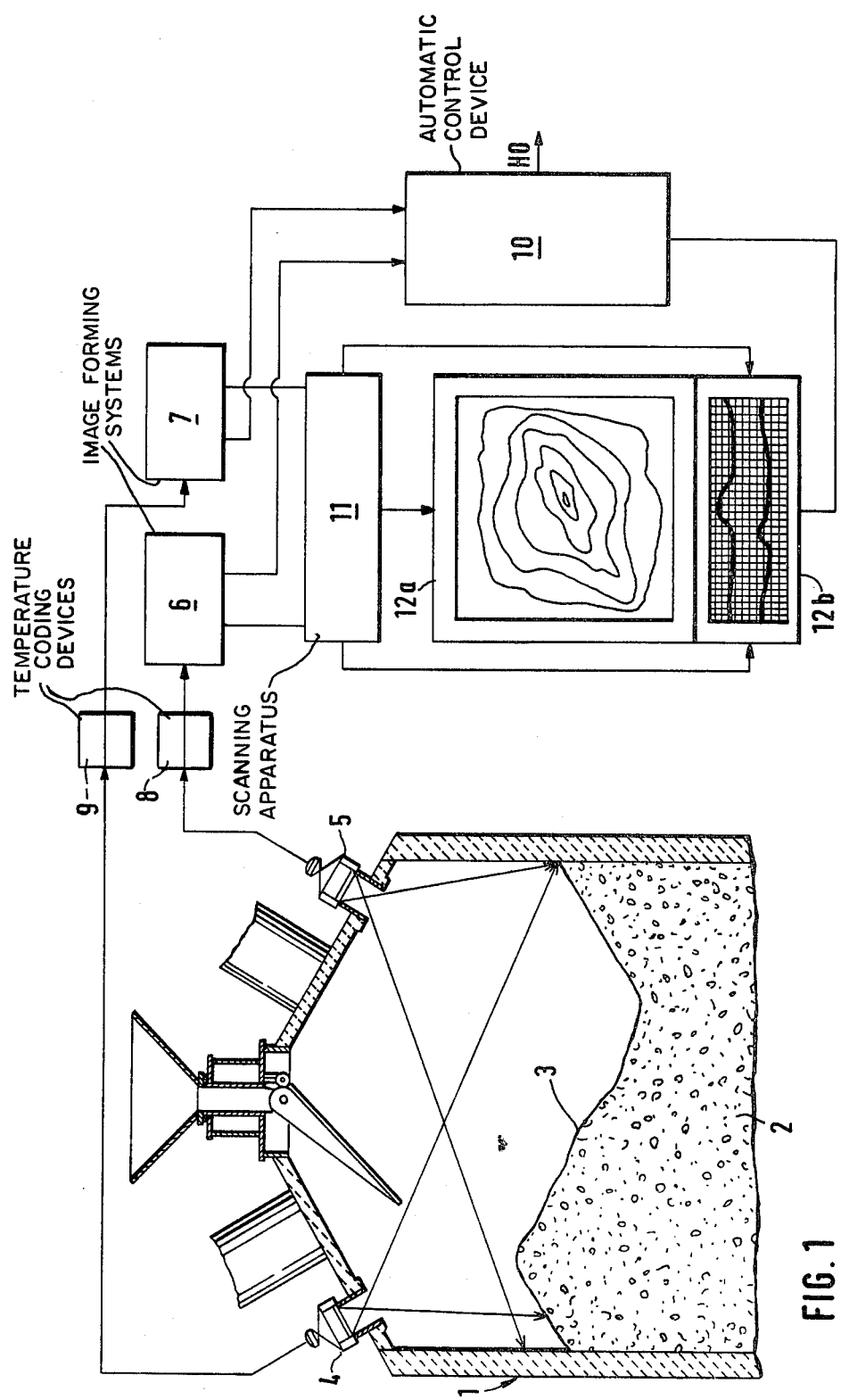
FIG. 1 is a schematic and partly block diagram showing the constructional principle of an apparatus in accordance with the present invention.

Turning now to the drawings, a schematic diagram of an illustrative profilometer embodying this invention for determining the three-dimensional surface profile of a furnace charge or burden is illustrated in FIG. 1. FIG. 1 shows a furnace 1 containing a charge or burden 2. To detect the infra-red rays emitted from a large number of temperature-characterized points on the surface of the burden 3, two infra-red radiation measuring instruments 4 and 5 are mounted in fixed positions at known positions and orientations with respect to each other over the charge or burden. In this embodiment the instruments are infra-red television cameras that are mounted on the head of the furnace in such a way that protection from top gas temperatures is provided, and removal and replacement of the cameras can be effected without interfering with the operation of the furnace. Such mounting means are well known.

In response to the infra-red rays detected by the cameras at any given time, each camera generates a set of temperature-position signals. Each signal has a temperature component which represents the wavelength of the infra-red rays detected for a particular angular direction with respect to the camera generating the signal of infra-red rays omitted from a particular temperature-characterized point on the surface of the burden. The set of temperature-position signals generated by a particular camera at a particular time thus provides a three-dimensional representation of the surface at that time in which one dimension relates to temperature and two dimensions relate to position. These representations are referred to herein as temperature images. Two cameras are provided so that two such sets of temperature-position signals can be generated at the same time. The two cameras are so oriented that the infra-red rays emitted from a large series of points are detected by both cameras at the same time. Thus, large subsets of the two simultaneous sets of temperature-position signals correspond to each other.

In accordance with the invention, a three-dimensional representation of the surface of the furnace burden in which all three position dimensions are represented is provided by combining two simultaneous sets of temperature-position signals. A representation of the surface in which all three position dimensions are represented is referred to herein as a three dimensional surface profile.

In carrying out the invention, an electronic image-forming system 6 and 7 is connected to each camera. As with other components in the apparatus embodying this invention, the particular features required in the image-forming system vary, depending on the method to be used in determining the three-dimensional surface profile. It will be seen that in some embodiments no visual image of the temperature-position signals are necessary. Turning to one method which does require generation of visually perceptible temperature images, in this embodiment each image-forming system records the temperature image represented by one of the simultaneous sets of signals on non-extensible photo-sensitive paper. When this is done with sufficient accuracy, it is possible to effect a direct surface profile mapping operation using techniques that are already well known in the art of photogrammetric mapping. This can be carried out by trained personnel or can be carried out with a computer.

In other embodiments, it may be desirable to generate visually perceptible temperature images even though such visual images are not utilized per se in the determination of the three dimensional surface profile. In these instances, the image-forming systems 6 and 7 may suitably comprise television receivers, which may be equipped with coding devices 8 and 9 for coding the temperature-position signals for color before they are received by the television receivers. In the latter instance, areas on the surface that are characterized by the same temperature are shown in the same color on the screen of the television receivers.

If the three-dimensional surface profile is not mapped from visually perceptible temperature images, certain other components of the profilometer are required. These components will be described in connection with the following additional preferred methods.

Figure 2:
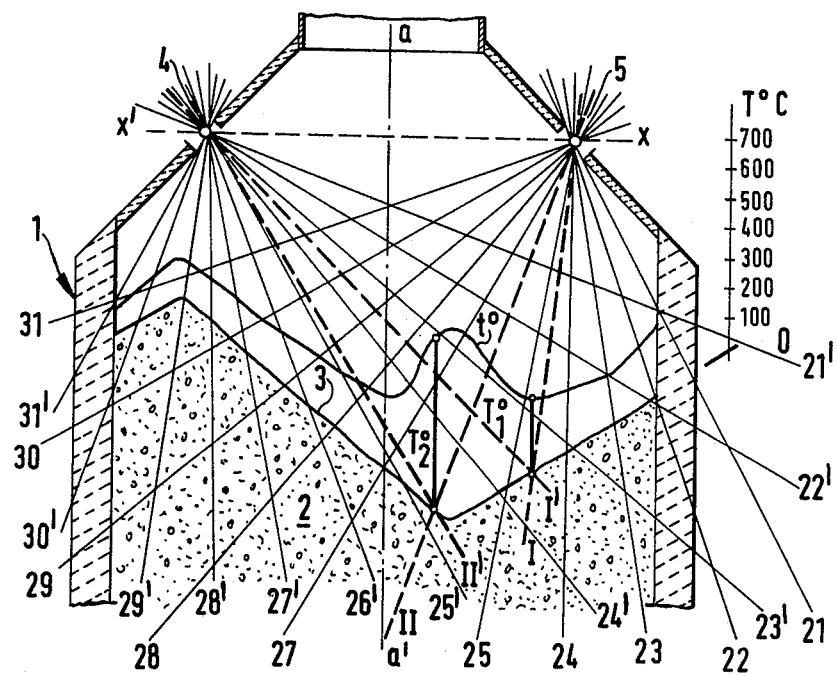
FIG. 2 is a diagram, in a plane of intersection, of the operation of determining the profile of the charge by means of two permanently installed infra-red measuring instruments.
Figure 2A:
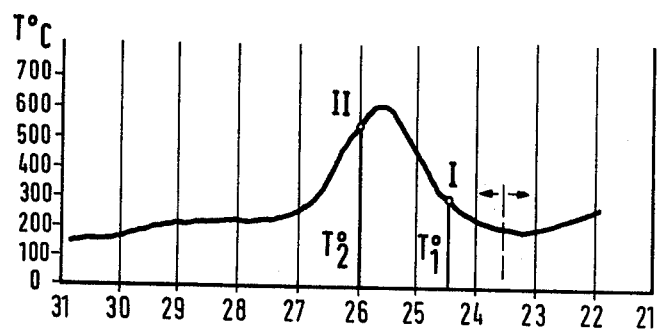
FIG. 2a and 2b are temperature curves for the plane of intersection in FIG. 2 which have been generated by means of the infra-red radiation measuring instruments shown in FIG. 2.
Figure 2B:
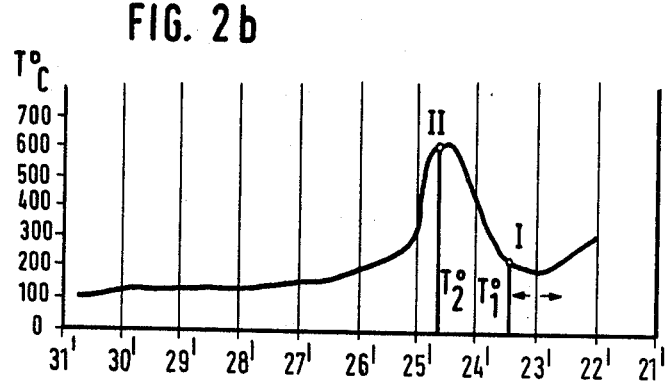

A second illustrative method for determining the three-dimensional surface profile of a charge or burden is illustrated in FIG. 2, 2a, and 2b, and will be discussed in conjunction with FIG. 1. In this method two cameras 4 and 5 are mounted in fixed positions and in known relative positions and orientations, as described in connection with FIG. 1, and the image-forming devices, as originally discussed, are unnecessary. Instead, a scanning apparatus is provided for segregating simultaneous sets of signals into subsets that contain only those signals which, as determined by the position components of the signals, correspond to given planes of intersection with the burden. Thus, for each given plane of intersection, a segregated subset of temperature-position signals that were originally generated by a first camera, and a segregated subset of simultaneous signals that were originally generated by the second camera are provided.

Each segregated subset of temperature-position signals represents a two-dimensional temperature-position curve, in which for example, the temperature and position components of each signal can be plotted as ordinate and abcissa respectively. A second position dimension for each point on the curve is, of course, determined by the particular plane to which the subset corresponds. For generating such curves in visually perceptible form, an electronic image-forming system 12b, such as a doubleray oscilloscope, is provided for each camera to receive segregated subsets of temperature-position signals from the scanning apparatus 11. The utility of these curves is clarified by reference to FIGS. 2, 2a, and 2b.

In FIG. 2 the infra-red rays emitted from the temperature-characterized points that lie on the surface at a particular plane of intersection are shown. In this case, the plane of intersection passes through the two cameras and is parallel to the longitudinal axis $a$–$a'$ of the furnace. For the sake of clarity only rays which are detected by one or the other of the cameras are shown, and only eleven rays at equal angular separations, are shown for each camera. The rays detected by a first camera have been numbered 21–30, and those detected by the second camera have been numbered 21'–31', the numbering proceeding clockwise. The temperature characteristic of each point on the surface in the illustrated plane is represented by curve $t°$.

When the set of signals generated by the first camera and the simultaneous set of signals generated by the second camera are segregated into subsets that correspond to the illustrated plane of intersection in the scanning apparatus 11, rays 21–30 will be included in a first subset, and rays 21′–31′ will be included in the corresponding second subset. The temperature-position curve generated by the electronic image-forming system 12b that receives the first subset is shown in FIG. 2a, and the temperature position curve generated by the electronic image-forming system 12b that receives the second subset is shown in FIG. 2b.

To determine the three-dimensional surface profile with respect to the points lying in the given plane of intersection illustrated in FIG. 2, a direct surface profile mapping operation is effected employing the two temperature-position curve images shown in FIGS. 2a and 2b. As illustrated, each of the two curves has a temperature maximum or peak. If the two cameras are located at sufficiently high positions and the surface is sufficiently regular to warrant the assumption that each camera detects infra-red rays from virtually every point on the surface that lies in the given plane, then the two peaks may be allocated to one and the same point. The position in space of this point can then be geometrically determined from the direction coordinate at each of the two peaks and the known relative positions of the two cameras. For the subsequent determination of the remaining points, each of the peaks may be used as an apex, i.e. as a point of guidance or reference. Thus, for the point on the surface characterized by temperature $T_{1'}$, which appears on the temperature-position curves of FIGS. 2a and 2b, starting from the apex of each curve and moving to the right, the first occasion on each curve at which $T_{1'}$ appears corresponds to this same point, and from the position coordinates corresponding thereto, the position in space of this point may be determined. The same operation may be performed for the point characterized by temperature $T_{2'}$, with the exception that one moves to the left of each apex rather than to the right. In this manner, the position of all points on the surface in the illustrated plane of intersection may be determined. To determine a complete three-dimensional surface profile, the surface profile for each of a plurality of planes of intersection is mapped in the same manner, and the results are combined.

When the surface is not sufficiently regular or the cameras are not located sufficiently high to detect infra-red rays from substantially every point in a plane of intersection, a more complicated method may be necessary to effect surface profile mapping. The sequence of temperature components of the signals in a first segregated set must then be compared with the sequence of temperature components of the signals in the corresponding segregated set to identify corresponding sequences and pair corresponding signals. This operation may be effected with an electronic computer, in which case the electronic image-forming systems for generating temperature-position curves may be omitted, and the computer may also be used to determine the position in space corresponding to each pair of signals.

An additional and more significant advantage to the use of a computer is that, with computers that are readily available on the market today, the determination of a surface profile for each plane of intersection can be effected simultaneously, thereby providing a set of height-position signals that correspond to a complete three-dimensional surface profile of the burden at a given time. To generate a visually perceptible image of the three-dimensional surface profile, from which conclusions may be drawn in regard to subsequent charging patterns, the set of height-position signals generated by the computer may be transmitted to an electronic image-forming device 12a. Again, the image-forming system may be one which records the image on photo-sensitive paper, or it may be a television receiver. If desired, the set of height-position signals may be coded for color in a coding device before they are received by the image-forming system, in which case areas on the surface that have the same height will appear as the same color on the image.

To control the charging of the furnace, the set of height-position signals may be transmitted directly to an automatic control device 10, in addition to or in lieu of transmitting the signals to an image-forming system.

In addition, the set of height-position signals can be retrievably stored for subsequent evaluation.

Figure 3:
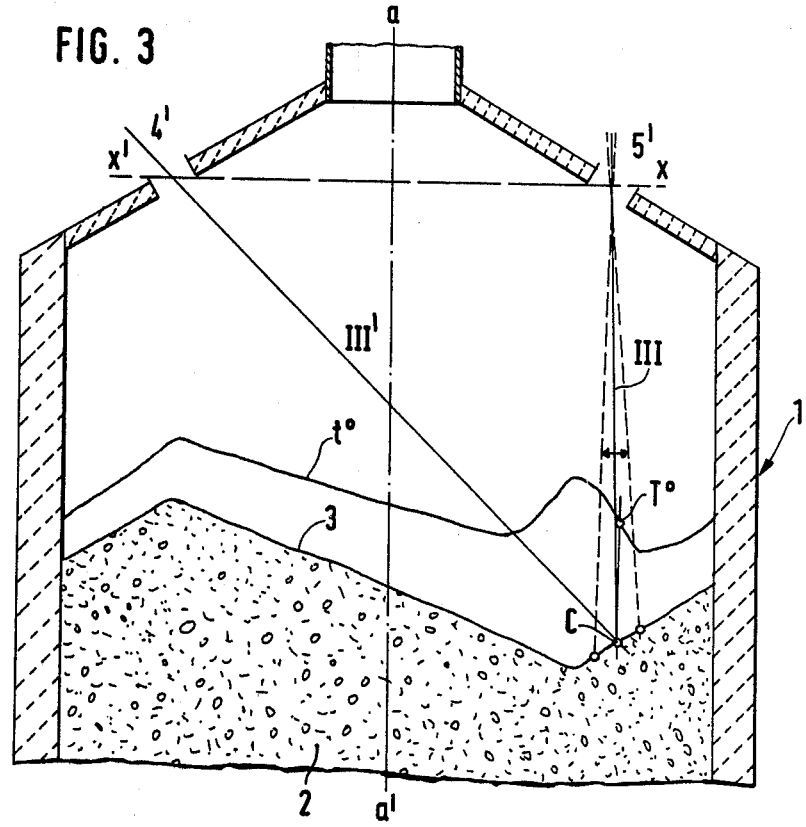
FIG. 3 shows the method of determining a surface profile by means of two angularly adjustable infra-red radiation measuring instruments, in a plane of intersection.

A further illustrative method embodying this invention is illustrated in FIG. 3. In this diagram a cross-section of the burden has once again been shown in one plane of intersection, i.e. in that which passes through the two infra-red television cameras 4′ and 5′ and parallel to the longitudinal axis $a$–$a'$ of the furnace.

In the process shown here two infra-red television cameras 4′ and 5′ are mounted for angular adjustment and can be adjusted by means of controllable drives not described here in detail. Both cameras are sharply focused, and operate as point-source infra-red detectors. A first camera 4′ serves as a pilot camera which scans the surface of the charge 3 in accordance with a preselected raster, and generates a temperature-position signal for each temperature-characterized point in a series of points determined by the raster. The temperature curve thus obtained is marked $t°$ in FIG. 3. The second camera 5′ operates as a follow-up camera and seeks the temperature-characterized points on which the pilot camera 4′ is focused at any given time. In reality this means that: when, for example, the first camera 4′ detects ray III′ from the temperature-characterized point C, it generates a first temperature-position signal; the follow-up camera 5′ then, by angular adjustment, scans the surroundings of point C on the surface of the charge until the temperature component of the signal it generates is exactly the same as that generated by the pilot camera 4′. This will occur when the follow-up camera detects ray III. When this is the case, the intersection point of the two rays is situated at point C on the surface of the charge, and the position components of the two signals received at this time determine the position in space of point C. This position can be calculated or determined geometrically from the known relative positions of the cameras and the two known position components.

The complete three dimensional surface profile of the charge can be determined in this manner by the systematic scanning of the surface on the raster principle and can be visualized and evaluated by means of the instruments described in conjunction with FIGS. 1 and 2. For angularly adjusting the infra-red television camera, a control apparatus for the scanning of the surface on the raster principle is required. This control apparatus, which will not be described here in detail, causes the pilot camera 4′ to scan the charge surface on the raster principle in accordance with a preselected program and causes the follow-up camera 5' to follow the leading camera 4' systematically and directly in accordance with the same program.

Instead of causing both camera 3' and 4' to scan the surface with a focused beam, it is equally possible for these cameras to be installed in a fixed position and for scanning of the charge surface on the raster principle to be effected by optical masking.

Throughout the specification and in the claims, reference is made to two infra-red radiation measuring instruments. It may be advantageous, although not absolutely necessary to install more than two instruments.

The apparatus and process according to the invention not only enable the temperature distribution over the charge surface to be determined but also provide a means of determining, at a certain moment, and without contact, i.e. without mechanical scanning devices, the complete three-dimensional surface profile of the charge or burden. Both data make an essential contribution to the optimum control of the smelting process. They also make it possible, particularly in conjunction with the bell-less charging device mentioned at the beginning, to complete the charging operation in the desired manner and, for example, to prevent the formation of steep "craters". One of the advantages of this system is that of preserving the even and uniform operation of the furnace and also of preventing the movement of grains on the surface of the burden, particularly the tendency of large pieces to roll down towards the center of the "crater", and thus to counteract the risk of the disintegration of the furnace burden.

The fact that this apparatus enables the burden to be monitored continuously without interrupting the smelting process and charging operation if a further advantage of the apparatus provided by the present invention for determining the surface profile of the charge.

I claim as my invention:

1. A method for determining the three-dimensional surface profile of the charge or burden in a furnace without physically contacting the charge or burden or interrupting the charging of the furnace, which comprises the steps of:
    (a) generating a first set of temperature-position signals from a first infra-red radiation measuring instrument, said first instrument being located over the charge or burden, said first set of signals corresponding to infra-red rays emitted from a series of temperature-characterized points on the surface of the charge or burden;
    (b) generating a second set of temperature-position signals from a second infra-red radiation measuring instrument, said second instrument being located over the charge or burden in a known position and orientation relative to said first instrument, said second set of signals corresponding to infra-red rays emitted from said series of points;
    (c) pairing individual signals in said first set of signals with individual signals in said second set of signals that represent infra-red rays corresponding to identical temperature-characterized points;
    (d) determining the position in space for each temperature-characterized point that is defined by each pair of signals, to provide multiple positions representing the three-dimensional profile.

2. A method for determining the three-dimensional surface profile of the charge or burden in a furnace without physically contacting the charge or burden or interrupting the charging of the furnace, which comprises the steps of:
    (a) generating a first set of temperature-position signals from a first infra-red radiation measuring instrument that is mounted over the charge or burden in a fixed position with respect to said furnace, said first set of signals corresponding to the infra-red rays emitted from a series of temperature-characterized points on the surface of the charge or burden and representing a temperature image of said surface,
    (b) generating a second set of temperature-position signals from a second infra-red radiation measuring instrument that is mounted over the charge or burden in a fixed position with respect to said furnace and in a known position and orientation relative to said first instrument, said second set of signals corresponding to the infra-red rays emitted from said series of points and representing a temperature image of said surface;
    (c) generating a first and second visually perceptible temperature image that represent said first and second sets of signals with an electronic image-forming system having sufficient accuracy to permit identification of the temperature and position components of the signals represented by points on said visually perceptible images;
    (d) pairing individual points on said first visually perceptible image with individual points on said second visually perceptible image that represent signals corresponding to identical temperature-characterized points, thereby determining two position components for each pair of signals;
    (e) determining the position in space for each temperature-characterized point that is defined by the two position components for each pair of signals, to provide multiple positions representing the three-dimensional surface profile.

3. A method for determining the three-dimensional surface profile of the charge or burden in a furnace without physically contacting the charge or burden or interrupting the charging of the furnace, which comprises the steps of:
    (a) generating a first set of temperature-position signals from a first infra-red radiation measuring instrument that is mounted over the charge or burden in a fixed position with respect to said furnace, said first set of signals corresponding to the infra-red rays emitted from a series of temperature-characterized points on the surface of the charge or burden, a first signal for each point in said series being generated at one time;
    (b) generating a second set of temperature-position signals from a second infra-red radiation measuring instrument that is mounted over the charge or burden in a fixed position with respect to said furnace and in a known position and orientation relative to said first instrument, said second set of signals corresponding to the infra-red rays emitted from said series of points, a second signal for each point in said series being generated at one time;
    (c) pairing individual signals in said first set of signals with individual signals in said second set of signals that represent infra-red rays corresponding to identical temperature-characterized points;
    (d) generating a height-position signal for each pair of signals that represents the position in space of each corresponding temperature-characterized point, thereby generating a set of height-position signals that represent the three-dimensional surface profile.

4. A method in accordance with claim 3 wherein said steps (c) and (d) are effected with an electronic computer.

5. A method in accordance with claim 4 wherein:
a further step is provided comprising receiving said set of height-position signals from said computer with an electronic image-forming system for generating a visually perceptible image of said three-dimensional surface profile.

6. A method in accordance with claim 5 wherein a further step is provided comprising:
coding said set of height-position signals for color in a coding device prior to receiving them with said electronic image-forming system.

7. A method for determining the three-dimensional surface profile of the charge or burden in a furnace without physically contacting the charge or burden or interrupting the charging of the furnace, which comprises the steps of:
(a) generating a first set of temperature-position signals from a first infra-red radiation measuring instrument that is mounted over the charge or burden, said first set of signals corresponding to the infra-red rays emitted from a series of temperature-characterized points on the surface of the charge or burden;
(b) generating a second set of temperature-position signals from a second infra-red radiation measuring instrument that is mounted over the charge or burden in a known position and orientation relative to said first instrument, said second set of signals corresponding to the infra-red rays emitted from said series of points;
(c) segregating subsets of said first and second sets of temperature-positions signals that correspond to given planes of intersection with the charge or burden in a scanning apparatus;
(d) pairing individual signals in a selectd segregated subset of said first set of temperature-position signals with individual signals that have identical temperature components in a corresponding subset of said second set of temperature-position signals;
(e) repeating step (d) for a plurality of planes of intersection;
(f) determining the position in space for each temperature-characterized point that is defined by a pair of signals,, to provide multiple positions representing the three-dimensional surface profile.

8. A method in accordance with claim 7 wherein said step (d) comprises:
generating a visually perceptible temperature-position curve for a selected first subset of said first set of temperature-position signals by receiving said fist subset of signals from said scanning apparatus with an electronic image-forming system;
simultaneously generating a visually perceptible temperature-position curve for a second subset of said second set of temperature-position signals that corresponds to the same plane of intersection as said first subset, by receiving said second subset of signals from said scanning apparatus with a second electronic image-forming system, and
pairing individual temperature-position points on said first temperature-position curve with individual temperature-position points on said second temperature-position curve that represent the same temperature-characterized point.

9. A method for determining the three-dimensional surface profile of the charge or burden in a furnace without physically contacting the charge or burden or interrupting the charging of the furnace, which comprises the steps of:
(a) generating a first set of temperature-position signals from a first infra-red radiation measuring instrument that is mounted over the charge or burden in a fixed position with respect to said furnace, said first set of signals corresponding to the infra-red rays emitted from a series of temperature-characterized points on the surface of the charge or burden, and representing a temperature image of said series of points;
(b) generating a second set of temperature-position signals from a second infra-red radiation measuring instrument that is mounted for the angular adjustment in a known position and in known orientations relative to said first instrument over the charge or burden, and is operated as a point-source infra-red ray detector, said series of points being scanned point-by-point to generate said second set of signals;
(c) pairing individual signals in said first set of signals with individual signals in said second set of signals that represent infra-red rays corresponding to identical temperature characterized points;
(d) generating a height-position signal for each pair of signals that represents the position in space of each corresponding temperature characterized point, thereby generating a set of height-position signals that represents the three-dimensional surface profile.

10. A method in accordance with claim 9 wherein said steps (c) and (d) are effected with an electronic computer.

11. A method in accordance with claim 10 wherein:
a further step is provided comprising receiving said set of height-position signals with an electronic image-forming system for generating a visually perceptible image of said three-dimensional surface profile.

12. A method in accordance with claim 11 wherein a further step is provided comprising:
coding said set of height-position signals for color in a coding device prior to receiving them with said electronic image-forming system.

13. A method in accordance with claim 9 wherein said step (c) is effected by masking said temperature image to isolate signals in said first set that have temperature components identical to those generated by said second instrument.

14. A method in accordance with claim 9 wherein the scanning by said second instrument is effected with a mechanical drive device.

15. A method for determining the three-dimensional surface profile of the charge or burden in a furnace without physically contacting the charge or burden or interrupting the charging of the furnace, which comprises the steps of:
(a) generating a first set of temperature-position signals from a first infra-red radiation measuring instrument that is mounted for angular adjustment over the charge or burden and is operated as a pilot point-source infra-red ray detector to scan a series of temperature-characterized points on the surface of the charge or burden point-by-point, and generate a first signal for each point in said series;

(b) generating a second temperature-position signal for each point in said series, at the same time that said first signal is generated, from a second infra-red radiation measuring instrument that is mounted for angular adjustment in a known position and in known orientations relative to said first instrument, over the charge or burden and is operated as a follow-up point-source infra-red ray detector, thereby providing a pair of signals for each temperature characterized point in said series.

(c) generating a height-position signal for each pair of signals that represents the position in space of each corresponding temperature-characterized point, thereby generating a set of height-position signals that represents the three-dimensional surface profile.

16. A method in accordance with claim 15 wherein the scanning by each of said first and second instruments is effected with a mechanical drive device for each of said instruments.

17. A method in accordance with claim 15 wherein the further step is provided comprising:
receiving said set of height-position signals with an electronic image-forming system for generating a visually perceptible image of said three-dimensional surface profile.

18. Apparatus for determining the three-dimensional surface profile of the charge or burden in a furnace comprising:
a first infra-red radiation measuring instrument located over the charge or burden for generating a first set of temperature-position signals that represent a first temperature image of a series of temperature-characterized points on the surface of the charge or burden;
a second infra-red radiation measuring instrument located over the charge or burden for generating a second set of temperature-position signals that represent a second two-dimensional temperature image of said series of points, said second infra-red radiation measuring instrument being located in a known position and orientation relative to said first instrument;
an electronic image-forming system for each instrument for receiving said first and second sets of temperature-position signals from said instruments and for recording said first and second two-dimensional temperature images on non-extensible photosensitive paper.

19. Apparatus for determining the three-dimensional surface profile of a charge or burden in a furnace comprising:
a first infra-red radiation measuring instrument located over the charge or burden for generating a first set of temperature-position signals that represents a first two-dimensional temperature image of a series of temperature-characterized points on the surface of the charge or burden;
a second infra-red radiation measuring instrument located over the charge or burden for generating a second set of temperature-position signals that represents a second two-dimensional temperature image of said series of points, said second infra-red radiation measuring instrument being located in a known position and orientation relative to said first instrument;
a scanning apparatus for receiving said first and second sets of signals from said first and second instruments, and for segregating a first series of subsets in said first set of signals, and a corresponding second series of subsets in said second set of signals, each subset corresponding to a given plane of intersection with the burden;
an electronic image-forming system for each instrument for receiving a selected subset of temperature-position signals and generating a visually perceptible temperature-position curve that corresponds to the plane of intersection for the selected subset.

20. Apparatus for determining the three-dimensional surface profile of the charge or burden in a furnace comprising:
a first infra-red radiation measuring instrument located over the charge or burden for generating a first set of temperature-position signals that represents a first two-dimensional temperature image of a series of temperature-characterized points on the surface of the charge of burden;
a second infra-red radiation measuring instrument located over the charge or burden for generating a second set of temperature-position signals that represents a second two-dimensional temperature image of said series of points, said second infra-red radiation measuring instrument being located in a known position and orientation relative to said first instrument;
an electronic computer for receiving signals from said first and second instruments, for pairing individual signals in said first set with individual signals in said second set that represent infra-red rays corresponding to identical temperature-characterized points, and for generating a height-position signal for each pair of signals that represents the position in space of each temperature-characterized point, thereby enabling the generation of a set of height-position signals that represents a three-dimensional surface profile; and
an electronic image-forming system for receiving said set of height-position signals from said scanning apparatus, and for generating a visually perceptible image of said three-dimensional surface profile.

21. Apparatus in accordance with claim 20 wherein a mechanical drive apparatus is connected to one of said instruments for angularly adjusting said instrument.

22. Apparatus in accordance with claim 20 wherein a mechanical drive apparatus is connected to each of said instruments for angularly adjusting said instruments.

23. Apparatus in accordance with claim 20 wherein a coding device is provided for coding signals for color before they are received by said image-forming system.

24. Apparatus in accordance with claim 20 wherein an electronic image-forming system is provided for each instrument for receiving temperature-position signals from said instrument before they are received by said scanning apparatus, and for generating visually perceptible images of said first and second temperature images.

25. Apparatus in accordance with claim 24 wherein a coding device is provided for each electronic image forming system for coding signals for color before they are received by said image-forming systems.

* * * * *

UNITED STATES PATENT OFFICE
CERTIFICATE OF CORRECTION

Patent No. 4,110,617　　　　　　　　　Dated　August 29, 1978

Inventor(s)　Edouard Legille

It is certified that error appears in the above-identified patent and that said Letters Patent are hereby corrected as shown below:

Column 2, line 15, replace "it" with --It--;

Column 7, line 34, replace "if" with --is--;

Column 9, line 41, replace "selectd" with --selected--;

Column 9, line 57, replace "fist" with --first--.

Signed and Sealed this

Twenty-fourth Day of April 1979

[SEAL]

Attest:

RUTH C. MASON
Attesting Officer

DONALD W. BANNER
Commissioner of Patents and Trademarks